(No Model.) 2 Sheets—Sheet 1.

T. HENRY.
PROCESS OF AND APPARATUS FOR BRONZING PAPER.

No. 249,835. Patented Nov. 22, 1881.

WITNESSES:
W. A. Chamberlin
F. A. Schmidt

INVENTOR
Thomas Henry
BY
W. F. Miller
ATTORNEY (No Model.) 2 Sheets—Sheet 2.

T. HENRY.
PROCESS OF AND APPARATUS FOR BRONZING PAPER.

No. 249,835. Patented Nov. 22, 1881.

WITNESSES:
W. A. Chamberlin
F. A. Schmidt

INVENTOR
Thomas Henry
BY
W. T. Miller
ATTORNEY

UNITED STATES PATENT OFFICE.

THOMAS HENRY, OF BUFFALO, NEW YORK.

PROCESS OF AND APPARATUS FOR BRONZING PAPER.

SPECIFICATION forming part of Letters Patent No. 249,835, dated November 22, 1881.

Application filed October 22, 1881. (No model.)

*To all whom it may concern:*

Be it known that I, THOMAS HENRY, a citizen of the United States, residing at Buffalo, in the county of Erie and State of New York, have invented certain new and useful Improvements in the Process of and Apparatus for Bronzing Wall and other Paper; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a process of and apparatus for bronzing wall and other paper. As is well known, the bronze is applied to those portions of the surface of the paper upon which varnish has been previously placed, which, while in a moist state, causes the bronze to adhere to the paper. The chief difficulty which has heretofore been encountered is that the varnish often chills or dries before the bronze can be applied. Various means have been employed to keep the varnish in the proper state for the reception of the bronze, notably by passing the paper over heated rollers to relax the varnish which has become dried, which often results in damage to the paper by overheating, &c.

My invention is designed to overcome the above-named difficulty; and to this end it consists, broadly, in the process of applying bronze which has been previously heated to the varnished surface, and also in apparatus for heating the bronze and maintaining such heat until it is brought in contact with the paper, as well as maintaining a constant and uniform heat within the box through which the paper passes while being bronzed.

Figure 1:
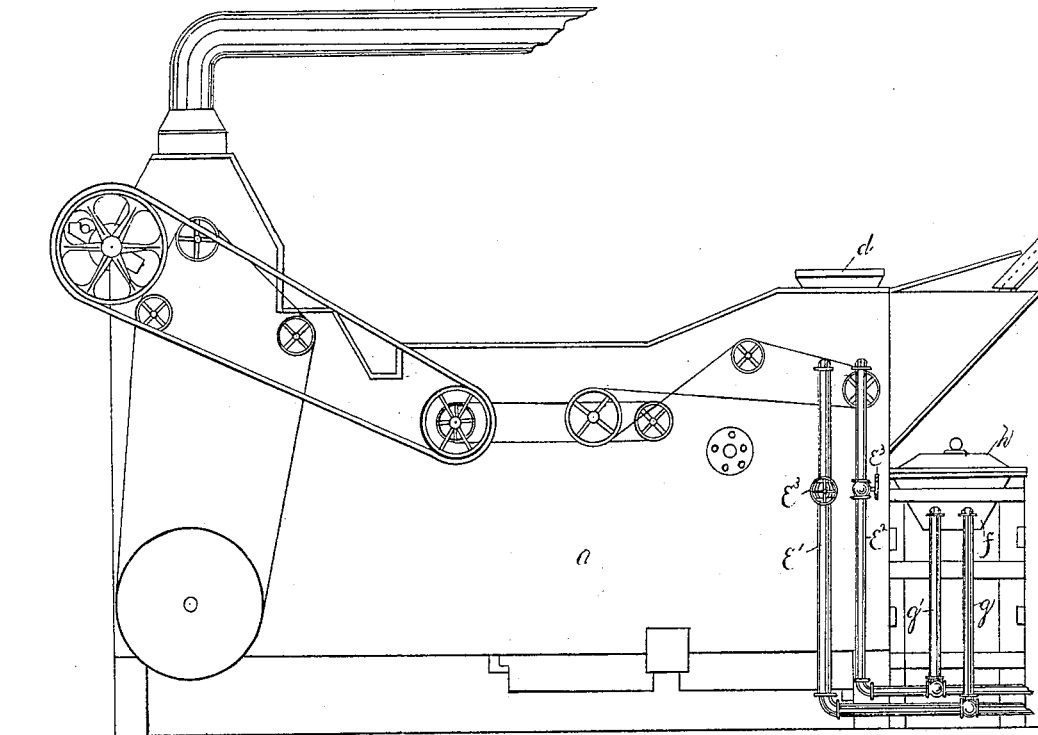
Figure 2:
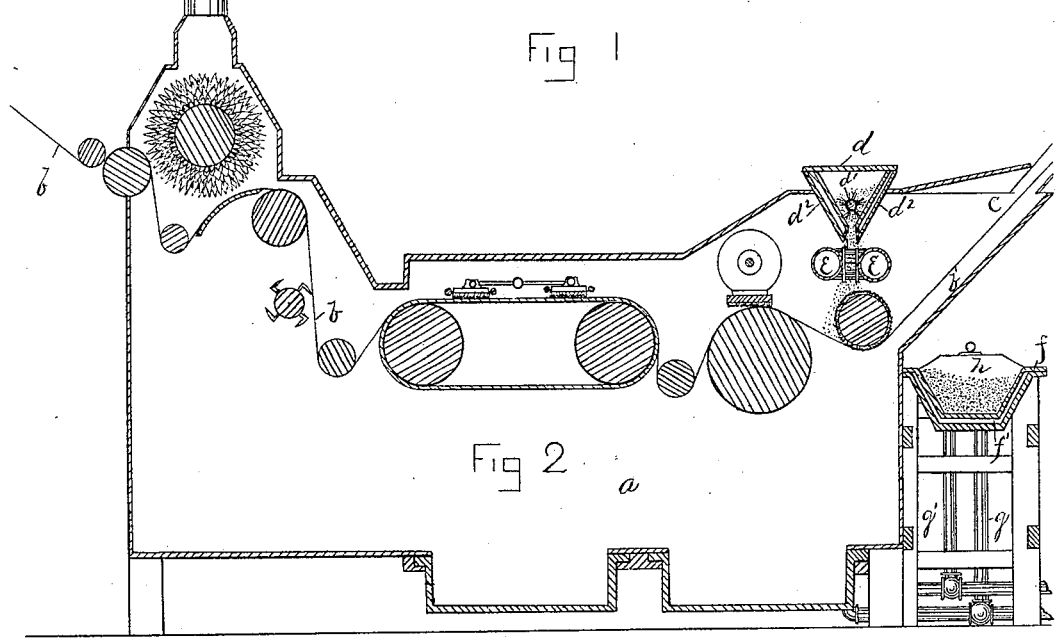
Figure 3:
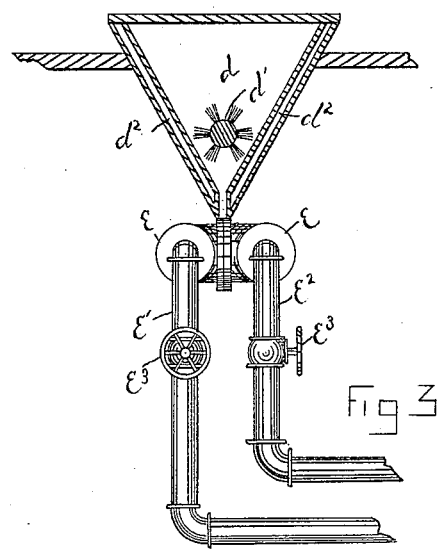
Figure 4:
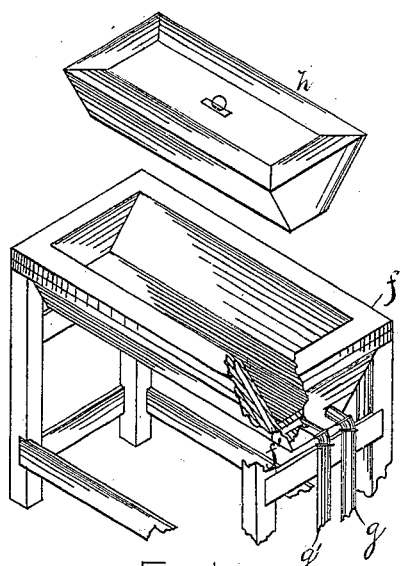

In the drawings, Figure 1 is a side elevation of my improved apparatus. Fig. 2 is a central section of Fig. 1. Fig. 3 is an enlarged detail view of the interior heating apparatus, partly in section; and Fig. 4 is a perspective view, partly in section, of the outside heating apparatus.

Referring to the drawings, I have therein shown my improved bronze-heating apparatus as applied to a well-known form of machine used in bronzing wall-paper, in which—

$a$ is the box or chamber containing the various devices used in applying the bronze.

$b$ is the paper, which enters the chamber $a$ at the point $c$. It passes under and over the various rollers, pads, and brushes, as clearly shown in Fig. 2. The bronze is applied to the paper through the hopper $d$.

The bronzing apparatus, as far as described, is old and well known.

My improved apparatus for heating the bronze is applied thereto as follows:

Immediately under the hopper $d$, which is supplied with the usual revolving brush, $d'$, is the interior heating apparatus, which consists of pipes E E, through which steam or hot air is introduced by means of the supply-pipe $E'$ and carried off through the waste-pipe $E^2$, each provided with suitable stop-cocks, $E^3$. The bronze in the hopper $d$, which is heated before being placed therein, falls through the bottom of the hopper upon and between the heated pipes E E, which serve to maintain the heat of the bronze at a proper point until it reaches the paper. These pipes E E also serve to maintain a constant and uniform heat within the entire chamber $a$.

The hopper $d$, as shown in the drawings, can be made with hollow sides $d^2$, into which steam or hot air may be introduced to further assist in maintaining the heat of the bronze.

Supported in suitable frame-work near the forward end of the chamber $a$ is located the outside bronze-heating apparatus, which consists of the jacket $f$ with the interior space, $f'$, into which steam or hot air is introduced through the supply-pipe $g$ and carried off through the waste-pipe $g'$. These supply and waste pipes are connected, respectively, with the supply and waste pipe $E'$ $E^2$ of the interior heating apparatus, all of which, being thus connected, can be supplied with steam or hot air from a common source.

$h$ is a pan adapted to rest in the jacket $f$, into which the bronze to be heated is placed, and by means of which it can be conveniently removed therefrom and carried to the hopper $d$. It will thus be seen that a constant supply of heated bronze can be had with which to supply the hopper $d$. The bronze falls from the hopper upon and between the heated pipes E E, which serve to maintain its heat until it is brought in contact with the varnished surface of the paper. If this varnish should by any means become chilled or set before entering the chamber, so that the bronze will not adhere thereto, the heat in the bronze will restore the varnish to its proper consistency for the reception and retention of the bronze upon the paper. The radiated heat from the pipes E E is further utilized in maintaining a proper degree of temperature throughout the chamber, and thus insuring a perfect adhesion of the bronze to all parts of the varnished surface.

By my improved process of applying bronze in a heated state I am enabled to utilize paper upon which the varnish has become thoroughly chilled, and which has heretofore been regarded as comparatively worthless, owing to the imperfect means employed for restoring the varnish to the proper consistency for applying the bronze.

I claim—

1. The process of applying bronze to a varnished surface, consisting in heating such bronze before its application thereto, and then applying it in its heated state to the varnished surface, substantially as shown and described.

2. An apparatus for heating bronze to be applied to a varnished surface, consisting of the jacket $f$ and pan $h$, for first heating the bronze, the supply-pipe $g$ and the waste-pipe $g'$, for introducing steam or hot air into jacket $f$, and the steam or hot-air pipes E E, located within the chamber $a$ of a bronzing-machine and below the hopper $d$ in such chamber, for maintaining the heat of the bronze which falls from such hopper upon the varnished surface, the pipes E E having connected thereto the supply-pipe E' and discharge-pipe $E^2$, all of which pipes being thereby adapted to be supplied with steam or hot air from a common source, substantially as shown and described.

3. In an apparatus for heating bronze to be applied to a varnished surface, the combination of hopper $d$ with the pipes E E and supply and discharge pipe E' $E^2$, for maintaining the heat of the bronze which falls from the hopper upon the varnished surface, substantially as shown and described.

4. In an apparatus for heating bronze to be applied to a varnished surface the combination of the hopper $d$ and jacket $f$ with the pipes E E, E' $E^2$, and $g$ $g'$, such pipes being connected together, as shown, and supplied with steam or hot air from a common source, substantially as shown and described.

5. In an apparatus for heating bronze to be applied to a varnished surface, the hopper $d$, provided with hollow side walls, $d^2$, adapted to receive steam or hot air, as and for the purpose stated.

THOMAS HENRY.

Witnesses:
F. A. SCHMIDT,
W. T. MILLER.